(12) United States Patent
Andersson et al.

(10) Patent No.: US 8,447,992 B2
(45) Date of Patent: May 21, 2013

(54) METHOD FOR DISTRIBUTING CONTENT TO A MOBILE DEVICE WITH DIGITAL RIGHTS AND MOBILE DEVICE THEREFOR

(75) Inventors: Stefan Andersson, Klagerup (SE); Markus Liwell, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 952 days.

(21) Appl. No.: 11/574,931

(22) PCT Filed: Sep. 7, 2005

(86) PCT No.: PCT/EP2005/054414
§ 371 (c)(1),
(2), (4) Date: May 29, 2007

(87) PCT Pub. No.: WO2006/029978
PCT Pub. Date: Mar. 23, 2006

(65) Prior Publication Data
US 2008/0040618 A1 Feb. 14, 2008

Related U.S. Application Data

(60) Provisional application No. 60/635,747, filed on Dec. 14, 2004.

(30) Foreign Application Priority Data

Sep. 14, 2004 (EP) .................................. 04021787
Nov. 30, 2004 (EP) .................................. 04106183

(51) Int. Cl.
*H04L 29/06* (2006.01)

(52) U.S. Cl.
USPC ............... 713/193; 713/185; 726/27; 726/31; 726/32; 726/33

(58) Field of Classification Search
None
See application file for complete search history.

(56) References Cited

U.S. PATENT DOCUMENTS

2003/0009667 A1   1/2003  Horiuchi et al.
2003/0028622 A1   2/2003  Inoue et al.
(Continued)

FOREIGN PATENT DOCUMENTS

EP   1433037      6/2004
EP   1 445 888    8/2004
(Continued)

OTHER PUBLICATIONS

International Search Report for corresponding Application No. PCT/EP2005/054414 mailed Dec. 15, 2005.
(Continued)

*Primary Examiner* — Brandon Hoffman
*Assistant Examiner* — Michael D Anderson
(74) *Attorney, Agent, or Firm* — Renner, Otto, Boisselle & Sklar, LLP

(57) ABSTRACT

The invention relates to a method for distributing content to a mobile device using a digital rights management (DRM) scheme, adapted for the case when files are exchanged over an external memory or over a serial connection between a computer (PC) and the mobile device, and a mobile device (ME) adapted therefor. The mobile device creates a request file (RORe-questrop) comprising information necessary for forming a rights object file. On the computer side, the request file is retrieved and a response file is sent back to the mobile device including the encrypted content (Contentdcf) and a rights object file (Content.ro). The mobile device receives the response file and decrypts and stores the content. The files may be exchanged over a DRM folder, arranged in the mobile device and accessible by the computer in mass storage mode, or the DRM folder may be arranged in an external memory (MS) alternately accessible by the mobile device and the computer.

30 Claims, 4 Drawing Sheets

U.S. PATENT DOCUMENTS

| | | |
|---|---|---|
| 2003/0224823 A1 | 12/2003 | Hurst et al. |
| 2004/0123050 A1 | 6/2004 | Knop et al. |
| 2005/0132208 A1* | 6/2005 | Hug et al. .................. 713/189 |

FOREIGN PATENT DOCUMENTS

| | | |
|---|---|---|
| JP | H08-263570 | 10/1996 |
| JP | H11-259964 | 9/1999 |
| JP | 2002-290603 | 10/2002 |
| JP | 2003-178163 | 6/2003 |
| JP | 2004-199682 | 7/2004 |
| RU | 2189119 | 9/2002 |
| RU | 2212118 | 9/2003 |
| WO | 98/33320 | 7/1998 |
| WO | 98/58510 | 12/1998 |
| WO | 03/014889 | 2/2003 |

OTHER PUBLICATIONS

OMA Digital Rights Management: "OMA Digital Rights Management, DRM Specification Version 2.0" 'Online!; OMA Open Mobile Alliance Ltd.; Jul. 2004; XP002335532.

OMA Digital Rights Management: "OMA Digital Rights Management, DRM Architecture Version 2.0" 'Online!; OMA Open Mobile Alliance Ltd.; Jul. 2004; XP002335636.

* cited by examiner

METHOD FOR DISTRIBUTING CONTENT TO A MOBILE DEVICE WITH DIGITAL RIGHTS AND MOBILE DEVICE THEREFOR

FIELD OF THE INVENTION

The present invention relates to a method for distributing content to a mobile device using a digital rights management (DRM) scheme, e.g. the Open Magic Gate (OMG)/Open Mobile Alliance (OMA) standard, adapted for the case when files are exchanged over an external memory or over a serial connection between a computer and the mobile device. The present invention also relates to a mobile device adapted therefor.

BACKGROUND OF THE INVENTION

Today content is distributed over the fixed Internet to portable devices such as mobile telephones and hand held devices. To prevent unauthorized copying etc., a digital rights management (DRM) scheme is used to protect the content. In the prior art, the content has been delivered in a session over a channel established between a computer, such as a content server, belonging the content provider or rights issuer, and a mobile device. The content is encrypted with a key and this key is sent to the mobile device separately and further encrypted with another key, which is associated with a mobile device. To form the encrypted key, the computer needs information from the mobile device, usually an identity number/public key and a random number. The content provider sends the encrypted key together with rights and permissions in a so called rights object. The mobile device will then be able to decrypt the content using information contained in the rights object.

One problem for a manufacturer of portable devices is that there is no established DRM standard. Open Mobile Alliance has put forth a standard for DRM targeted at download over the wireless network and peer-to-peer distribution using Obex and Bluetooth. The main problem with the OMA specification is that it does not cover the use of file-based DRM, e.g. using USB and memory cards. This effectively makes the specification useless for the case when a personal computer is connected to a content provider server for later delivery to the mobile device, or the case when the content is first downloaded to an external memory for later delivery to the mobile device.

SUMMARY OF THE INVENTION

The invention solves this problem by using ordinary files that can be easily exchanged and the Rights Object Acquisition Protocol (ROAP) as the key exchange protocol. The mobile device creates a request file comprising information necessary for forming a rights object file. On the computer side, the request file is retrieved and a response file is sent back to the mobile device including the encrypted content and a rights object file. The mobile device receives the response file and decrypts and stores the content. The files may be exchanged over a DRM folder, arranged in the mobile device and accessible by the computer in mass storage mode, or the DRM folder may be arranged in an external memory alternately accessible by the mobile device and the computer.

In a first aspect, the invention provides a method for distributing content from a computer system (PC) to a mobile device (ME), comprising the steps of:
in the mobile device (ME) creating a rights object request file (RORequest.rop) including information necessary for forming a rights object response file (ROResponse) including a nonce associated with the mobile device (ME);
storing the rights object request file in a folder (DRM);
storing a copy of the nonce in the mobile device (ME);
in the computer system (PC) reading the rights object request file from the folder (DRM);
in the computer system (PC), based on a protected content file, forming a rights object file (Content.ro) using said information in the rights object request file and an encrypted content file (Content.dcf);
storing the rights object file (Content.ro) and the encrypted content file (Content.dcf) in the folder (DRM);
in the mobile device (ME) retrieving the rights object file (Content.ro), and decrypting the associated encrypted content file (Content.dcf) using the rights object file (Content.ro) and the stored copy of the nonce.

Suitably, after using a rights object file (Content.ro), the rights object file (Content.ro) and the stored copy of the nonce is discarded.

In one embodiment, a physical connection is established between the computer system (PC) and the mobile device (ME).

The physical connection may be a connection over a cable, radio or IR light, suitably a serial (USB) connection.

Suitably, the folder (DRM) is located in a memory integrated with the mobile device (ME), and the computer system (PC) enters a communication mode for reading and storing files in the folder (DRM).

In an alternative, the folder (DRM) is located in an external memory connected to the mobile device (ME), and the computer system (PC) enters a communication mode for reading and storing files in the folder (DRM).

In another embodiment, an external memory containing the folder (DRM) is used as a channel between the computer (PC) and the mobile device (ME), the external memory being alternately connected to the mobile device (ME) and the computer (PC).

A plurality of external memories may be involved, the mobile device (ME) creating and storing a separate nonce copy for each external memory in the mobile device (ME) and a nonce copy in the folder (DRM) on the respective external memory.

Suitably, the rights object request file (RORequest.rop) contains information about the identity of the mobile device (ME), the mobile device (ME) nonce, the mobile device (ME) certificate chain and signature; and the rights object response file (ROResponse) contains information about the identity of the mobile device (ME), the identity of a rights issuer, the mobile device (ME) nonce, the rights issuer's certificate chain and signature, the rights object file (Content.ro) carrying rights and permissions as well as an encrypted key (CEK), and an encrypted content file (Content.dcf).

The content to be distributed may be converted from one digital rights management scheme to a content file (Content.omg) according to another digital rights management scheme, preferably the Open Magic Gate (OMG) digital rights management scheme.

In one embodiment, the content file (Content.omg) is converted to the Open Mobile Alliance digital rights management (OMA DRM) format by executing the Rights Object Acquisition Protocol (ROAP) to form the rights object file (Content.ro) containing a content encryption key (CEK) encrypted with the public key and nonce of the mobile device (ME), and generating an encrypted content file (Content.dcf) using the content encryption key (CEK).

In an alternative, the computer system is divided in a personal computer (PC) and a content server, the method comprising the steps of:

receiving the content file (Content.omg) and the rights object request file (RORequest.rop) in the personal computer (PC), and then performing the execution of the Rights Object Acquisition Protocol (ROAP) and the generation of the encrypted content file (Content.dcf) in the personal computer (PC).

In another alternative, the computer system is divided in a personal computer (PC) and a content server, the method comprising the steps of:

generating the encrypted content file (Content.dcf) in the content server and transferring it to the personal computer (PC);

receiving the (RORequest.rop) in the personal computer (PC) and forwarding it to the content server;

performing the execution of the Rights Object Acquisition Protocol (ROAP) in the content server;

and transferring the rights object file (Content.ro) to the personal computer (PC).

In a further alternative, the computer system is divided in a personal computer (PC) and a content server, the method comprising the steps of:

receiving the content file (Content.omg) and generating the encrypted content file (Content.dcf) in the personal computer (PC);

receiving the (RORequest.rop) in the personal computer (PC) and forwarding it to the content server together with the content encryption key (CEK);

performing the execution of the Rights Object Acquisition Protocol (ROAP) in the content server;

and transferring the rights object file (Content.ro) to the personal computer (PC).

In a still further alternative, the computer system is divided in a personal computer (PC) and a content server, the method comprising the steps of:

generating the encrypted content file (Content.dcf) in the content server and transferring it to the personal computer (PC) together with the content encryption key (CEK);

receiving the (RORequest.rop) and performing the execution of the Rights Object Acquisition Protocol (ROAP) in the personal computer (PC).

In a second aspect, the invention provides a mobile device (ME) for receiving content from a computer system (PC), wherein the mobile device (ME) is arranged to:

create a nonce and a rights object request file (RORequest.rop) including the nonce and information necessary for forming a rights object response (ROResponse);

store the rights object request file in a folder (DRM);

store a copy of the nonce in the mobile device (ME);

retrieve a rights object file (Content.ro) and an encrypted content file (Content.dcf) emanating from a rights object response (ROResponse);

and decrypt the associated encrypted content file (Content.dcf) using the rights object file (Content.ro) and the stored copy of the nonce, and store the decrypted content file in a rights object (RO) database.

Suitably, the mobile device (ME) is arranged, after using a rights object file (Content.ro), to discard the rights object file (Content.ro) and the stored copy of the nonce.

In one embodiment, the mobile device (ME) is arranged to establish a physical connection between the computer system (PC) and the mobile device (ME).

The physical connection may be a connection over a cable, radio or IR light, suitably a serial (USB) connection.

Suitably, the folder (DRM) is located in a memory integrated with the mobile device (ME), and the mobile device (ME) is arranged to enter a communication mode letting the computer system (PC) read and store files in the folder (DRM).

In an alternative, the folder (DRM) is located in an external memory connected to the mobile device (ME), and the mobile device (ME) is arranged to enter a communication mode letting the computer system (PC) read and store files in the folder (DRM).

In another embodiment, the mobile device (ME) is arranged to use an external memory containing the folder (DRM) as a channel between the computer system (PC) and the mobile device (ME), the external memory being alternately connected to the mobile device (ME) and the computer system (PC).

Suitably, the mobile device (ME) comprises a nonce cache and is arranged to accommodate a plurality of external memories, wherein the mobile device (ME) is arranged to create and store a separate nonce copy for each external memory in said nonce cache and a nonce copy in the folder (DRM) on the respective external memory.

Suitably, the mobile device (ME) is arranged to insert information about the identity of the mobile device (ME), the mobile device (ME) nonce, the mobile device (ME) certificate chain and signature into the rights object request file (RORequest.rop).

Preferably, the mobile device (ME) is arranged to receive a rights object file (Content.ro) containing a content encryption key (CEK) encrypted with the public key and nonce of the mobile device (ME), and a content file (Content.dcf) encrypted using the content encryption key (CEK) according to a digital rights management format, preferably the Open Mobile Alliance digital rights management (OMA DRM) format.

The mobile device (ME) may be a mobile radio terminal, e.g. a mobile telephone, a pager, a communicator, an electric organiser, or a smartphone.

BRIEF DESCRIPTION OF THE DRAWINGS

The invention will be described in detail below with reference to the accompanying drawings, in which.

DETAILED DESCRIPTION OF PREFERRED EMBODIMENTS

The invention will be described with reference to the OMG/OMA DRM scheme, but can be extended to any other DRM scheme that involves a handshake procedure. The invention is suitable for two-pass protocols but may be extended to any n-pass protocols. This means that any number n messages may be sent between the client and the server. OMA specifies 1-pass, 2-pass and 4-pass. The invention provides a method for running any-n pass DRM protocols using files.

Figure 1:
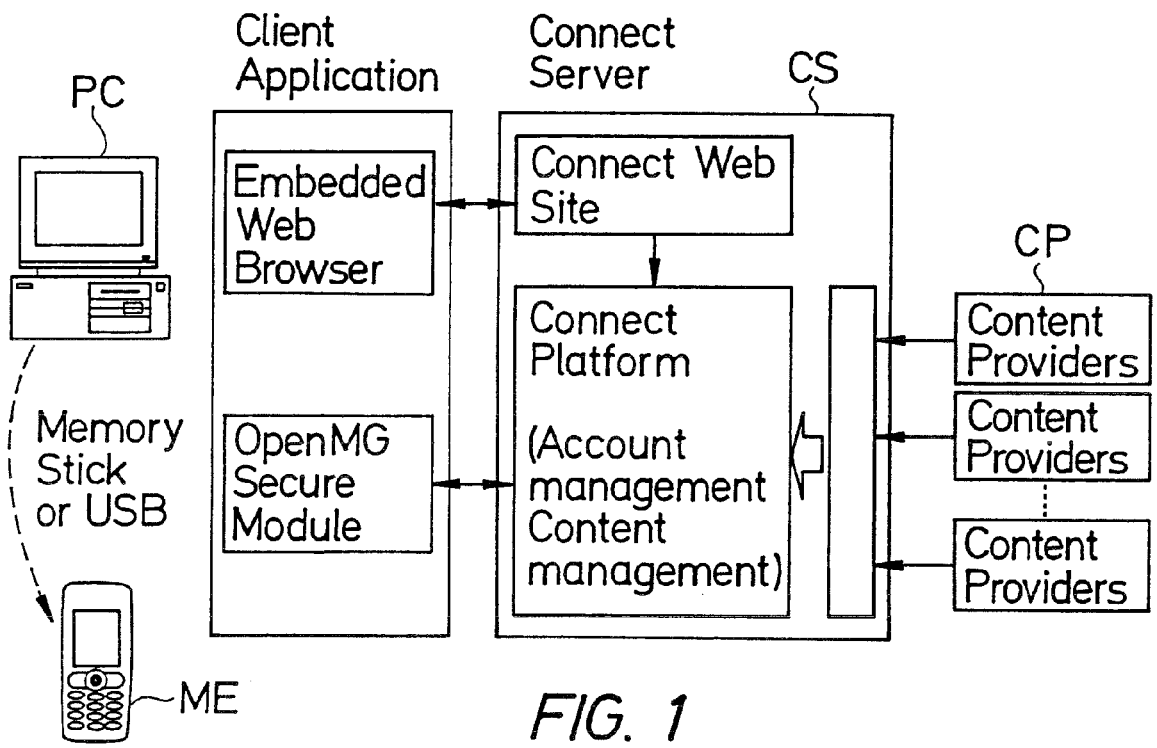
FIG. 1 is a schematic overview of entities involved in the method according to the invention.

With reference to FIG. 1, the content distribution system generally consists of three main components: a content (or connect) server CS infrastructure, a client application (SonicStage in the Sony Connect Architecture) in a personal computer PC and a mobile device or equipment ME rendering and using the content.

Content is aggregated by the content server infrastructure and distributed to the client application including a web browser and preferably an OpenMG Secure Module over the web. This link may be protected by the Open Magic Gate DRM scheme. The client application is suitably implemented as a plug-in architecture that enables the mobile equipment manufacturers to integrate their system in the personal computer PC. In the present invention, users move the content onto their rendering device either over a physical connection such as a Universal Serial Bus USB or an external memory or other removable memory medium. The DRM mechanism will depend on the bearer technology used.

The rights and permissions to use the content item are controlled by a rights issuer RI. The rights issuer is managing the content server CS. In some instances of this invention the content server CS may be identical with the personal computer PC.

The personal computer contains the client application for interfacing with the content server (unless the content server is integrated with the personal computer). As will be described below with reference to the method, the personal computer PC contains means for performing reading from an external memory, such as a Memory Stick™, or entering into USB mass storage mode, in which the computer takes control over files residing in the mobile device ME over a channel. This channel may be a physical USB connection over cable, radio, such as Bluetooth, or IR light. Generally, any means of moving files are applicable, even file transfer protocol (FTP).

The mobile equipment ME may be a mobile radio terminal, such as a mobile telephone, a pager, a communicator, an electric organizer or a smartphone. It is provided with an agent for performing the handshake and other procedures involved in the present invention. The agent is adapted to create a rights object request message and random number, a nonce, as will be described below. The mobile device ME also contains a nonce cache and a rights object database for storing the decrypted content items. The mobile device's file system may be stored internally or partly on an attached external memory. In USB mass-storage mode, relevant files are accessible by the personal computer, particularly a digital rights management, DRM, folder which is used for exchanging rights object files between the mobile device ME and the personal computer PC.

The main idea of the invention is using an authentication and key exchange protocol that runs between the personal computer PC and the mobile device ME. For instance the OMA DRM phase II implementation is suitable. This is used to securely negotiate the content encryption key CEK and the rights object RO.

The content file received over a protected link in the format Content.omg is encrypted using a content encryption key CEK into a Content.dcf (DRM encrypted content) file and moved to the mobile device's file system. Once the file Content.dcf is stored in the file system, it can be used by the media applications without implementation of additional DRM support. One advantage of the invention is that the issue of secure storage on the mobile device ME is automatically solved, since the OMA mechanisms are reused.

As the key exchange protocol, suitably the ROAP (Rights Object Acquisition Protocol) defined in OMA DRM phase II is utilised. The ROAP creates a rights object file Content.ro carrying rights and permissions for the content and a CEK encrypted with the public key and nonce of a mobile device ME. The rights object file Content.ro is sent in a protected format to the mobile device. Note that the rights object file Content.ro needs information from the mobile device, while the encryption of the content only needs the CEK, which is not provided by the mobile device.

By means of the scheme of the invention, content can be moved securely to the device and can be stored e.g. on an external memory. It is not possible to move the content to another mobile device, since the rights object file Content.ro is associated with the mobile device and cannot be forwarded to another.

The necessary information from the mobile device ME is sent to the personal computer PC in a RORequest message, in a special file format, in this specification referred to as RORequest.rop. The RORequest message should contain at least information about the identity/public key and nonce of the mobile device, for instance the following values:

| | |
|---|---|
| Device ID | Hash of the device's public key |
| Domain ID | — |
| RI ID | — |
| Device Nonce | 14 Base64-encoded characters |
| Request Time | "Undefined" |
| RO Info | — |
| Certificate Chain | Device certificate chain |
| Extensions | Transaction Identifier: "Sony Ericsson Connect V1.0" |
| Signature | XML-dsig |

The agent in the mobile device creates the RORequest message and stores it in the DRM folder.

On the computer side, the personal computer retrieves the RORequest message from the DRM folder and responds by storing a ROResponse message in the same DRM folder. The ROResponse message should contain at least information about the identity/public key of the rights issuer, the identity/public key and nonce of the mobile device, and the rights object RO, for instance the following values:

| | (1-pass) |
|---|---|
| Status | OK |
| Device ID | Hash of the device's public key |
| RI ID | Hash of the rights issuer's public key |
| Device Nonce | The original 14 Base64-encoded characters sent by the ME |
| Protected ROs | As described below |
| Certificate Chain | RI certificate chain |
| OCSP Response | — |
| Extensions | Transaction Identifier: "Sony Ericsson Connect V1.0" |
| Signature | XML-dsig |

The protected rights object RO contains rights and permissions and the encrypted CEK. The response message also includes the encrypted content file Content.dcf.

The keys in the rights object are encrypted with the public key and the random number, nonce, of the mobile device using a common wrapping scheme.

The procedure for distributing content to the mobile device will now be described. We assume that content has been downloaded to the personal computer PC. The content may be in any suitable DRM format and may be converted to the OMG format in the personal computer. In one embodiment, the invention assumes a mass-storage implementation that gives the personal computer PC access to an external memory or relevant files of the internal file system in the mobile device ME. We start with the case when the mobile device is empty, i.e. the rights object database is empty and the nonce cache is empty.

The agent of the mobile device ME creates an RORequest file RORequest.rop including at least the necessary information for forming a rights object response file. The RORequest file is stored in a file system in the DRM folder, that may reside in an internal memory of the mobile device or an external memory attached to the mobile device. Also the nonce, i.e. the random number inserted in the RORequest file, is stored in a nonce cache on the mobile device ME.

The personal computer reads the RORequest file and extracts the relevant information forming the ROResponse message including the information as stated above. The response message is also stored on the DRM folder.

Then the mobile device scans the DRM folder for rights object files. Any new files found are verified with the copy of a nonce stored in the mobile device and the encrypted key CEK is unwrapped with the private key of the mobile device. The encrypted content file Content.dcf is decrypted and stored in the RO database on the mobile phone or on an external memory. When an RO file has been used in this way, and the corresponding rights object RO is stored in the database, the RO file is deleted from the DRM folder. In this way, the mobile device ME can cope with a situation when it is powered down before all files in the DRM folder are registered. Next time it is powered up, it simply continues registering the rights object files in the DRM folder.

One RORequest file formed by the mobile device ME and one ROResponse message formed by personal computer corresponds to two passes, i.e. n=2. Note that the inventive method is not limited to a specific number of passes but any number of exchanged files may occur.

When the mobile device ME has been in use for some time, the DRM folder may contain RO files that have not been registered in the mobile device. When the mobile device ME is powered-up, or when USB mass storage mode is deactivated (the mobile device ME exits USB mass storage mode), or when the internal drive is unmounted (in the case when the communication protocol is arranged on the internal drive) or when a memory stick is inserted, the following is done:

The mobile device ME scans the DRM folder on the memory stick for RO files. New files are verified, unwrapped and the result is registered in the RO database on the mobile device, as outlined above.

In order that the personal computer should always be able to send a new RO file with new content to the mobile device, the mobile device ME creates a new RORequest file using a fresh nonce and stores it in the DRM folder. This fresh nonce is also stored in the persistent cache memory and used nonces are replaced.

Since the DRM folder may reside on an external memory, it should be possible to use the mobile device together with several external memories. Therefore, the persistent storage on the phone holding the nonce value is designed to cache several values, typically ten.

The nonce cache should have the following properties:

Nonce values are replaced when they have been used to verify new rights object files.

The oldest nonce shall be replaced if a fresh nonce has been generated and cache is full.

Figure 2:
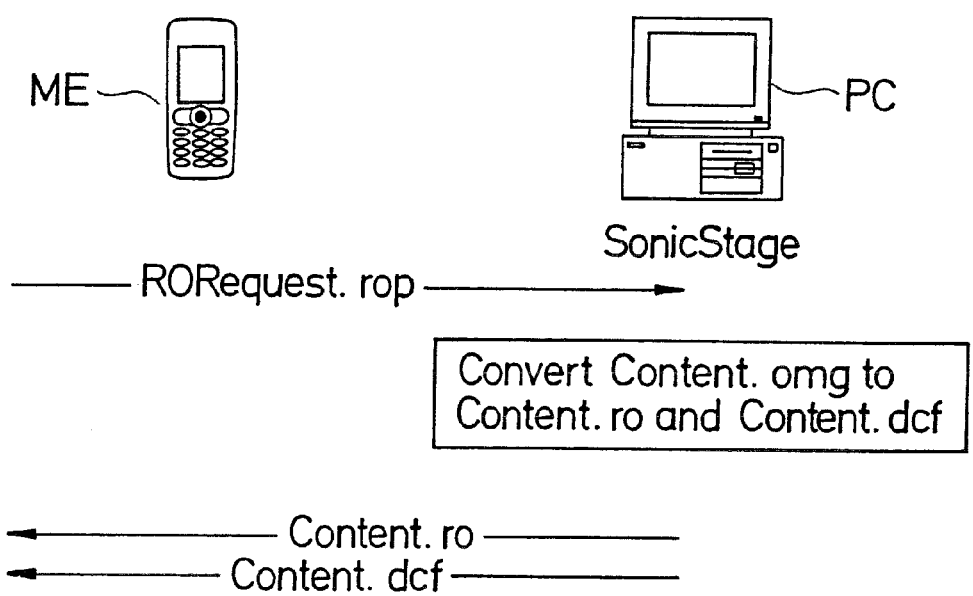
FIG. 2 is a diagram showing transfer using USB.

The use case when content and rights objects are transferred using USB is described with reference to FIG. 2. Other cache methods are also possible, such as round-robin etc. Step by step the procedure is as follows:

The mobile device generates the RORequest file, RORequest.rop, and stores it in the DRM folder on an attached external memory MS (such as the Sony Memory Stick™) or on its internal file system.

The mobile device ME enters USB mass storage mode.

The personal computer PC reads the RORequest file, RORequest.rop.

The personal computer PC converts the content file, Content.omg, to OMA format, i.e. Content.ro and Content.dcf, using the information in the RORequest file.

The personal computer stores the resulting RO message, i.e. Content.ro and Content.dcf, in the dedicated DRM folder, either on the mobile internal file system or on an external memory attached to the mobile device ME. The encrypted content files Content.dcf are stored among the content in the database, either in the mobile device's internal file system or on an external memory attached to the mobile device ME.

Figure 3:
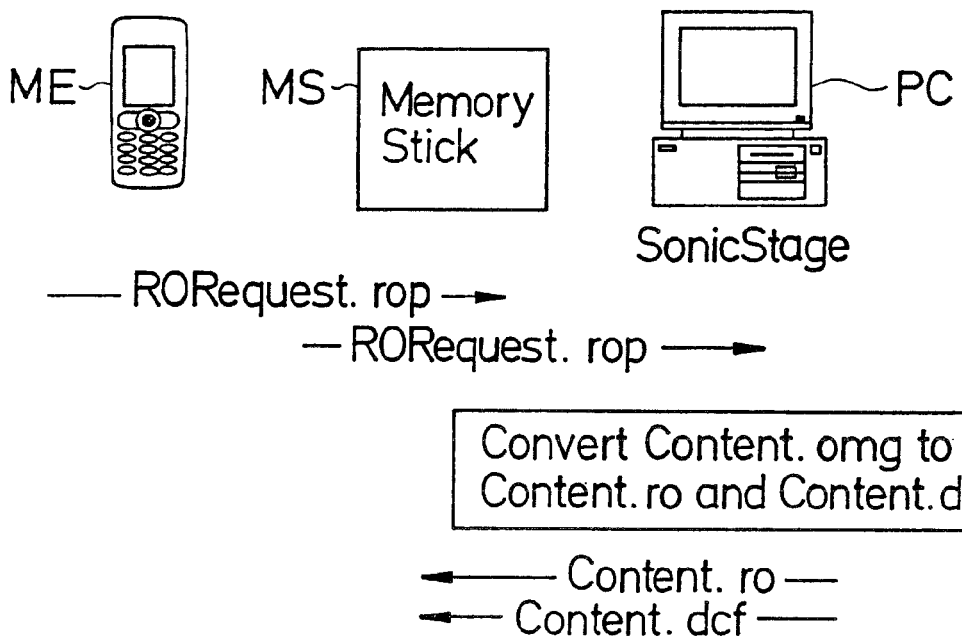
FIG. 3 is a diagram showing transfer using an external memory.

The use case when content and rights object are transferred from a personal computer to a mobile device using an external memory as the channel is described with reference to FIG. 3. Step by step the procedure is as follows:

The mobile device generates the RORequest file, RORequest.rop, and stores it in the DRM folder on an attached external memory MS (such as the Sony Memory Stick™).

The external memory MS is removed from the mobile device ME and connected to the personal computer PC.

The personal computer PC reads the RORequest file from the external memory MS.

The personal computer PC converts the content file from OMG format to OMA format using the information in the RORequest file.

The personal computer PC stores the resulting RO in the dedicated folder on the external memory MS. The DCF files are stored in the content folder(s) on the external memory MS.

The external memory MS is removed from the personal computer PC and attached to the mobile device ME. This can be made at any time later.

The mobile device ME scans the DRM folder, verifies and unwraps the rights object file and decrypts the encrypted content file and stores it in the RO database.

As may be appreciated, the client application in the personal computer PC cannot create rights object files for a given external memory unless the external memory carries a RORequest.rop file, i.e. the memory must have been inserted in the mobile device ME and have received the necessary information in the dedicated DRM folder before content can be transferred to the memory.

The mobile device should be able to handle the RO case when it detects a DRM folder carrying rights object files created for another mobile device, i.e. the mobile device should not delete the RO files. In other words, when the mobile device detects RO files that cannot be verified with any of its nonce values of the nonce cache, the RO files should be disregarded only, but not deleted.

There are some alternative embodiments for implementing the inventive DRM scheme in the computer side infrastructure. The embodiments are based on the following facts:

The generation and encryption of the content to the DCF file can be done independently of, and even prior to, the execution of the ROAP protocol forming the rights object file. In practise, this means that we can make any combination of the implementations as listed in the table below. In these embodiments, the mobile device ME will not notice any differences.

|  | ROAP executed on the PC | ROAP executed in the network |
| --- | --- | --- |
| DCF generation on the PC | PC only | Hybrid 1 |
| DCF generation in the network | Hybrid 2 | Network only |

Figure 4A:
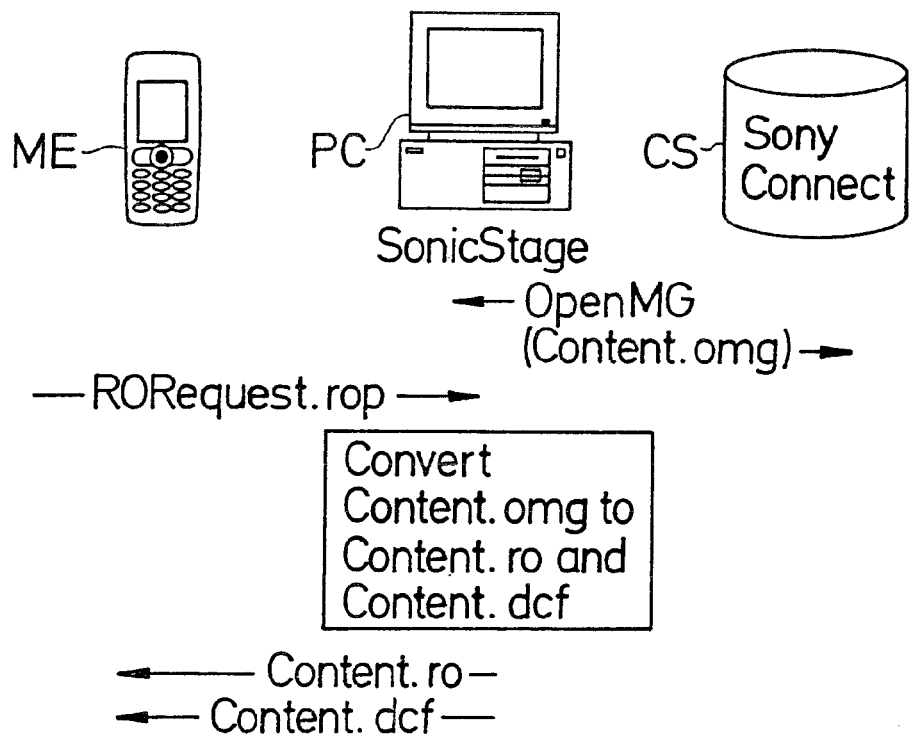
FIGS. 4A-4D are diagrams of different alternatives on the computer side for performing the key exchange and transferring the rights object to the mobile device.

FIG. 4A describes the PC only case when the full conversion from OMG to OMA DRM is performed on the personal computer. The client application of the personal computer PC simply decrypts the content from OMG format, reencrypts it and packages it in the DCF format into the Content.dcf file and the Content.ro file using the information from the RORequest.rop file. Note that it is the content server CS that generates the content encryption key CEK, which protects the content file. CEK is included in the Content.omg file.

Figure 4B:
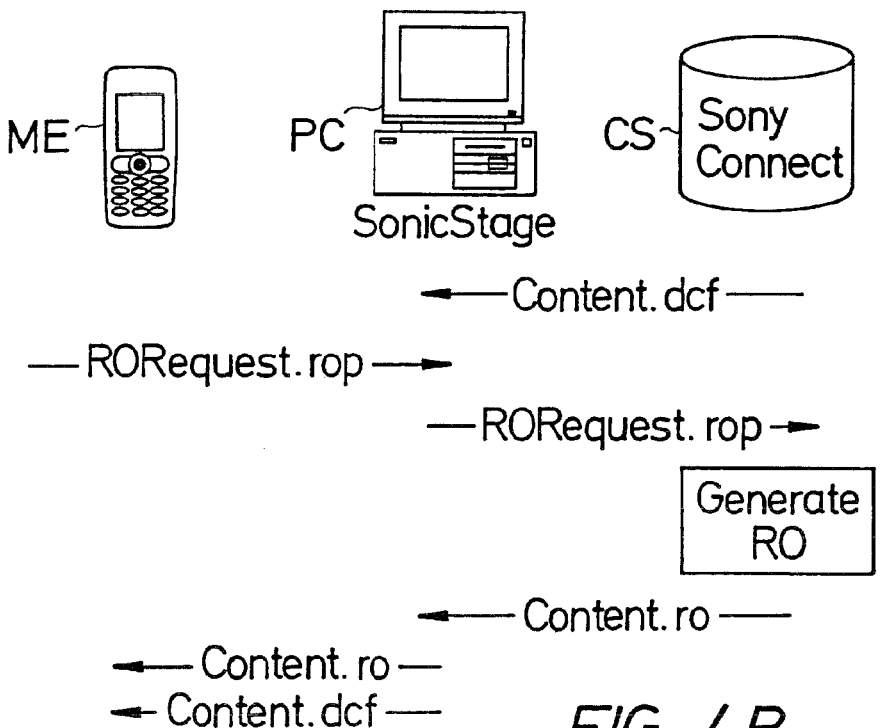

In a further embodiment, the network only case, both DCF generation and ROAP are executed in the network, as is described with reference to FIG. 4B. The content files Content.dcf are generated in OMA DRM format already on the content server CS. This does not involve any information from the mobile device ME. Files can be downloaded to the personal computer PC regardless whether or not the personal computer PC is connected a mobile device. However, when the user wants to move content to the phone, a rights object file has to be created and this requires information from the mobile device ME. As the rights object is generated in the content server CS, the rights object request RORequest.rop generated in the mobile device ME is forwarded from the personal computer PC to the content server CS. Then the content server generates the rights object file Content.ro and forwards it to the personal computer. The personal computer PC may then forward the rights object file Content.ro and the encrypted content file Content.dcf to the mobile device ME in accordance with any of the above described use cases. This network only embodiment has some security advantages, since it is possible to revoke devices on the server, but this comes at the cost of always requiring a network connection when content is moved to the mobile device.

Figure 4C:
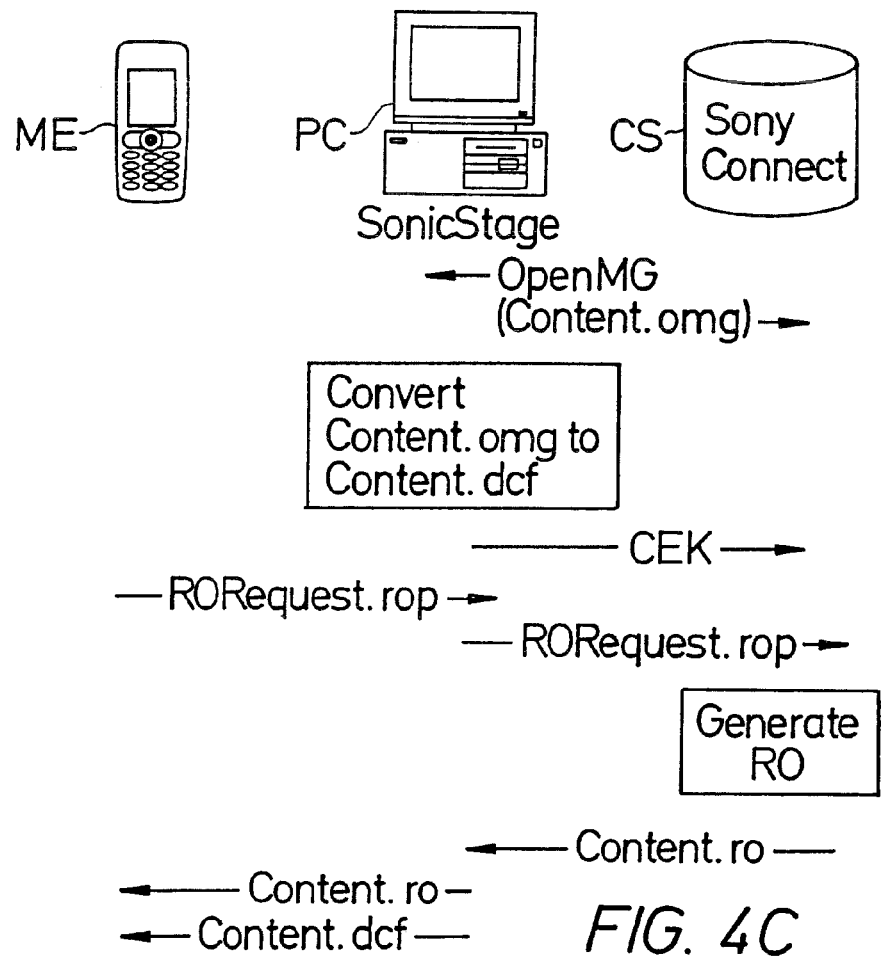

In a still further embodiment, Hybrid 1, the DCF file is generated on the personal computer PC and the ROAP is executed in the network, as is described with reference to FIG. 4C. Here, content is transferred to the personal computer PC protected by OMG. The client application in the personal computer PC performs the conversion of Content.omg to the decrypted file Content.dcf in the same way as described in the PC only case previously. When content is to be moved to the mobile device ME, the client application must contact the content server CS to get an appropriate rights object file Content.ro for the target mobile device ME. This is done by forwarding the RORequest from the mobile device ME to the content server CS. The content server must also know the CEK used to form the encrypted content file and this must be done securely. Following alternative solutions are possible:

Establish a secure channel, such as the Sony Secure Authenticated Channel SAC, between the personal computer PC and the content server CS using OMG protocols, or use the MG-R content key also as the content encryption key CEK for the encrypted content file Content.dcf. The CEK can be sent to the server as in the EKB format used during the initial content download phase.

Figure 4D:
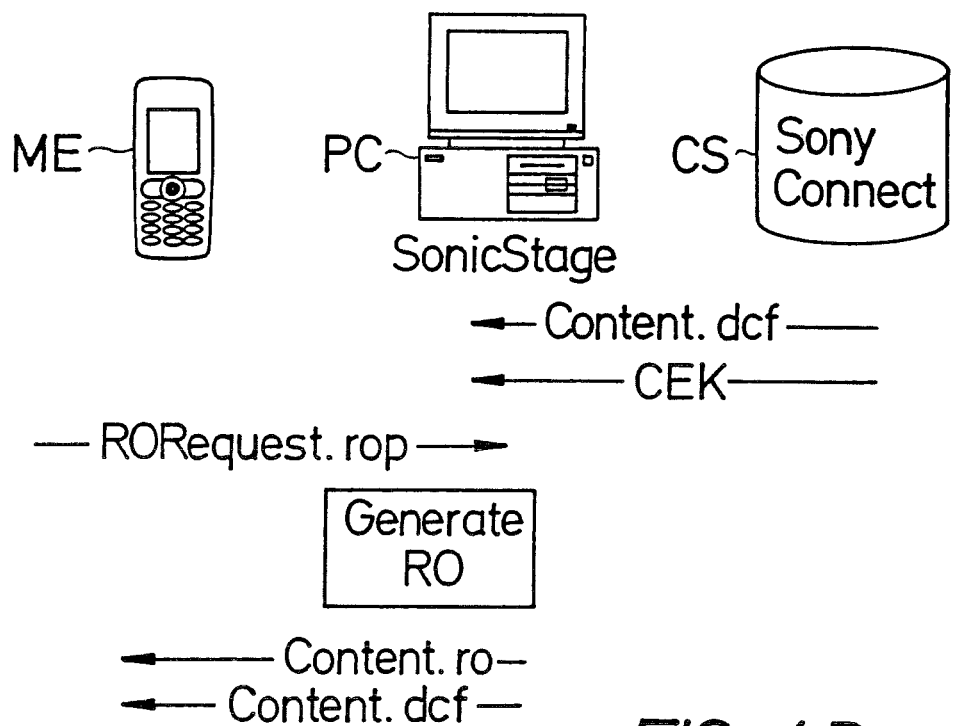

In a still further embodiment, Hybrid 2, the DCF is generated in the network and the ROAP is executed in the personal computer PC. This is described with reference to FIG. 4D. In this embodiment, the content files are generated in the encrypted OMA DRM format already on the content server CS. The Content.dcf files can be downloaded to the personal computer PC regardless whether it is connected to a mobile device ME or not, just in the network only solution. This time, the personal computer PC also needs a CEK used for encryption of the content file. Just in the previous embodiment, this can be done using an Open Magic Gate based secure channel or MG-R. Since ROAP is executed on the personal computer PC, the RORequest.rop file is only forwarded to the personal computer PC, which then can form the rights object file Content.ro.

In the examples above, the mobile device communicates with a unit represented by a personal computer. The personal computer may also be another mobile device or even a self-contained memory card with a processor and DRM agent of its own.

The scope of the invention is only limited by the claims below.

The invention claimed is:

1. A method for distributing content from a computer system (PC) to a mobile device (ME), comprising the steps of:
   providing a memory storing a folder (DRM) which is attachable to the mobile device (ME) and accessible by a computer system (PC) for exchange of DRM files between the mobile device (ME) and the computer system (PC);
   in the mobile device (ME) creating a rights object request file (RORequest.rop) including information necessary for forming a rights object response file (ROResponse) including a nonce associated with the mobile device (ME);
   storing the rights object request file in the folder (DRM) stored in the memory;
   storing a copy of the nonce in the mobile device (ME);
   letting the computer system (PC) enter a communication mode for reading and storing files in the folder (DRM);
   in the computer system (PC) accessing the memory and reading the rights object request file from the folder (DRM);
   in the computer system (PC), based on a protected content file, forming a rights object file (Content.ro) using said information in the rights object request file and an encrypted content file (Content.dcf);
   storing the rights object file (Content.ro) and the encrypted content file (Content.dcf) in the folder (DRM) stored in the memory;
   in the mobile device (ME) accessing the folder (DRM) from the memory and retrieving the rights object file (Content.ro), and decrypting the associated encrypted content file (Content.dcf) using the rights object file (Content.ro) and the stored copy of the nonce.

2. A method according to claim 1, further comprising the steps of:
   after using a rights object file (Content.ro), discarding the rights object file (Content.ro) and the stored copy of the nonce.

3. A method according to claim 1, wherein a connection is established between the computer system (PC) and the mobile device (ME).

4. A method according to claim 3, wherein the connection is a physical connection over a cable, or a connection via radio or IR light.

5. A method according to claim 4, wherein the physical connection is a serial (USB) connection.

6. A method according to claim 3, wherein the folder (DRM) is located in a memory integrated with the mobile device (ME).

7. A method according to claim 3, wherein the folder (DRM) is located in an external memory connected to the mobile device (ME).

8. A method according to claim 1, wherein an external memory containing the folder (DRM) is used as a channel between the computer (PC) and the mobile device (ME), the external memory being alternately connected to the mobile device (ME) and the computer (PC).

9. A method according to claim 8, wherein a plurality of external memories is involved, the mobile device (ME) creating and storing a separate nonce copy for each external memory in the mobile device (ME) and a nonce copy in the folder (DRM) on the respective external memory.

10. A method according to claim 1, wherein the rights object request file (RORequest.rop) contains information about the identity of the mobile device (ME), the mobile device (ME) nonce, the mobile device (ME) certificate chain and signature; and the rights object response file (ROResponse) contains information about the identity of the mobile device (ME), the identity of a rights issuer, the mobile device (ME) nonce, the rights issuer's certificate chain and signature, the rights object file (Content.ro) carrying rights and permissions as well as an encrypted key (CEK), and an encrypted content file (Content.dcf).

11. A method according to claim 1, wherein the content to be distributed is converted from one digital rights management scheme to a content file (Content.omg) according to another digital rights management scheme.

12. A method according to claim 11, wherein the other digital rights management scheme is the Open Magic Gate "OMG" digital rights management scheme.

13. A method according to claim 12, wherein the content file (Content.omg) is converted to the Open Mobile Alliance digital rights management "OMA DRM" format by using the Rights Object acquisition Protocol "ROAP" to form the rights object file (Content.ro) containing a content encryption key (CEK) encrypted with the public key and nonce of the mobile device (ME), and generating an encrypted content file (Content.dcf) using the content encryption key (CEK).

14. A method according to claim 13, wherein the computer system is divided into a personal computer (PC) and a content server, the method comprising the steps of:
receiving the content file (Content.omg) and the rights object request file (RORequest.rop) in the personal computer (PC), and then using the Rights Object Acquisition Protocol "ROAP" and performing the generation of the encrypted content file (Content.dcf) in the personal computer (PC).

15. A method according to claim 13, wherein the computer system is divided into a personal computer (PC) and a content server, the method comprising the steps of:
generating the encrypted content file (Content.dcf) in the content server and transferring it to the personal computer (PC);
receiving the (RORequest.rop) in the personal computer (PC) and forwarding it to the content server;
using the Rights Object Acquisition Protocol "ROAP" in the content server;
and transferring the rights object file (Content.ro) to the personal computer (PC).

16. A method according to claim 13, wherein the computer system is divided into a personal computer (PC) and a content server, the method comprising the steps of:
receiving the content file (Content.omg) and generating the encrypted content file (Content.dcf) in the personal computer (PC);
receiving the (RORequest.rop) in the personal computer (PC) and forwarding it to the content server together with the content encryption key (CEK);
using the Rights Object Acquisition Protocol "ROAP" in the content server;
and transferring the rights object file (Content.ro) to the personal computer (PC).

17. A method according to claim 13, wherein the computer system is divided into a personal computer (PC) and a content server, the method comprising the steps of:
generating the encrypted content file (Content.dcf) in the content server and transferring it to the personal computer (PC) together with the content encryption key (CEK);

receiving the (RORequest.rop) and using the Rights Object Acquisition Protocol "ROAP" in the personal computer (PC).

18. A mobile device (ME) for receiving content from a computer system (PC), wherein the mobile device (ME) is arranged to:
create a nonce and a rights object request file (RORequest.rop) including the nonce and information necessary for forming a rights object response (ROResponse);
store the rights object request file in a folder (DRM) in a memory which is attachable to the mobile device (ME) and accessible by a computer system (PC) for exchange of DRM files between the mobile device (ME) and the computer system (PC);
store a copy of the nonce in the mobile device (ME);
retrieve a rights object file (Content.ro) and an encrypted content file (Content.dcf) emanating from a rights object response (ROResponse) from the DRM folder stored in the memory;
and decrypt the associated encrypted content file (Content.dcf) using the rights object file (Content.ro) and the stored copy of the nonce, and store the decrypted content file in a rights object (RO) database.

19. A mobile device (ME) according to claim 18, wherein the mobile device (ME) is arranged, after using a rights object file (Content.ro), to discard the rights object file (Content.ro) and the stored copy of the nonce.

20. A mobile device (ME) according to claim 18, wherein the mobile device (ME) is arranged to establish a connection between the computer system (PC) and the mobile device (ME).

21. A mobile device (ME) according to claim 20, wherein the connection is a physical connection over a cable, or a connection via radio or IR light.

22. A mobile device (ME) according to claim 21, wherein the physical connection is a serial "USB" connection.

23. A mobile device (ME) according to claim 20, wherein the folder (DRM) is located in a memory integrated with the mobile device (ME), and the mobile device (ME) is arranged to enter a communication mode letting the computer system (PC) read and store files in the folder (DRM).

24. A mobile device (ME) according to claim 20, wherein the folder (DRM) is located in an external memory connected to the mobile device (ME), and the mobile device (ME) is arranged to enter a communication mode letting the computer system (PC) read and store files in the folder (DRM).

25. A mobile device (ME) according to claim 18, wherein the mobile device (ME) is arranged to use an external memory containing the folder (DRM) as a channel between the computer system (PC) and the mobile device (ME), the external memory being alternately connected to the mobile device (ME) and the computer system (PC).

26. A mobile device (ME) according to claim 25, wherein the mobile device (ME) comprises a nonce cache and is arranged to accommodate a plurality of external memories, wherein the mobile device (ME) is arranged to create and store a separate nonce copy for each external memory in said nonce cache and a nonce copy in the folder (DRM) on the respective external memory.

27. A mobile device (ME) according to any one of claims 18 to 26, wherein the mobile device (ME) is arranged to insert information about the identity of the mobile device (ME), the mobile device (ME) nonce, the mobile device (ME) certificate chain and signature into the rights object request file (RORequest.rop).

28. A mobile device (ME) according to claim 27, wherein the mobile device (ME) is arranged to receive a rights object file (Content.ro) containing a content encryption key (CEK) encrypted with the public key and nonce of the mobile device (ME), and a content file (Content.dcf) encrypted using the content encryption key (CEK) according to a digital rights management format.

29. A mobile device (ME) according to claim 28, wherein the digital rights management format is the Open Mobile Alliance digital rights management "OMA DRM" format.

30. A mobile device (ME) according to claim 18, wherein it is a mobile radio terminal, e.g. a mobile telephone, a pager, a communicator, an electric organiser, or a smartphone.

* * * * *